US006264496B1

(12) United States Patent
Robertson et al.

(10) Patent No.: US 6,264,496 B1
(45) Date of Patent: Jul. 24, 2001

(54) ELECTRICAL COMPONENTS

(75) Inventors: James William Robertson; Harry Milton Capper, both of Harrisburg, PA (US); Robert Naas, Skaneateles, NY (US); Kurt Werner, Auburn, NY (US); Deborah Laun, Syracuse, NY (US); Howard Scott Ryan, Skaneateles, NY (US)

(73) Assignee: Tyco Electronics Corp., Wilmington, DE (US)

( * ) Notice: Subject to any disclaimer, the term of this patent is extended or adjusted under 35 U.S.C. 154(b) by 0 days.

(21) Appl. No.: 09/488,631

(22) Filed: Jan. 20, 2000

Related U.S. Application Data

(63) Continuation-in-part of application No. 09/454,931, filed on Dec. 3, 1999.

(51) Int. Cl.[7] .................................................... A01R 24/26
(52) U.S. Cl. .......................... 439/409; 439/417; 439/410
(58) Field of Search .................................... 439/409, 410, 439/417, 400, 395

(56) References Cited

U.S. PATENT DOCUMENTS

| | | | | |
|---|---|---|---|---|
| 4,684,195 | * | 8/1987 | Anderson et al. | 439/409 |
| 4,795,364 | * | 1/1989 | Frantum, Jr. et al. | 439/409 |
| 5,174,783 | * | 12/1992 | Stassen et al. | 439/410 |
| 5,667,402 | * | 9/1997 | Denovich et al. | 439/409 |

* cited by examiner

*Primary Examiner*—Renee Luebke
*Assistant Examiner*—Briggitte Hammond

(57) ABSTRACT

An electrical receptacle for electrical connection to insulated electrical conductors comprises a dielectric housing (12) including a first housing section (22) and a second housing section (24); first and second electrical contact members (38, 40) disposed in the dielectric housing (12) and having first contacts (38*b,* 40*b*) in alignment with slots (26, 28) of the dielectric housing and second contacts (38*a,* 40*a*) in alignment with openings (58) of the dielectric housing including insulation-displacement contacts; and conductor-moving members (16, 18) associated with the insulation-displacement contacts-for moving the insulated electrical conductors into the insulation-displacement contacts thereby effecting electrical connections between the insulation-displacement contacts and the insulated electrical conductors.

5 Claims, 6 Drawing Sheets

ELECTRICAL COMPONENTS

CROSS REFERENCE TO RELATED APPLICATION

This application is a Continuation-In-Part Application of U.S. patent application Ser. No. 09/454,931 filed Dec. 3, 1999.

FIELD OF THE INVENTION

The present invention relates to electrical components and more particularly to electrical receptacles having insulation-displacement contacts therein.

BACKGROUND OF THE INVENTION

Electrical receptacles or outlets as well as electrical switches are electrically connected to current-carrying electrical conductors of copper wires covered with insulation. The procedure to electrically connect the electrical conductors to electrical contact members of the receptacles or switches involves the following: strip the insulation to expose wire ends of the copper wires, form the wire ends into hooks, place the hooks under heads and around the shafts of screws of the contact members, and tighten the screws thereby securing the copper wires on the contact members and effecting electrical connections therewith.

Care must be exercised in each of the above steps to insure an effective electrical connection. The insulation must be removed so as not to nick or cut the copper wires, because nicking or cutting the copper wires weakens them and also creates a local spot of increased electrical resistance due to copper material being removed which will result in a local hot spot as electrical current flows through the copper wires. The hooks must be large enough to fit around the screw shafts but small enough to be engaged by the screw heads upon tightening of the screws. None of the insulation must be disposed between the screw heads and the contact members. If insulation is present in the electrical connections, the connecting force applied to the copper wires will be decreased thereby increasing the electrical resistance of the electrical connections. The screws must be tight in order to provide optimum electrical connections; however, overtightening the screws will strip the threads of the screws or the threaded holes of the contact members, thereby resulting in poor electrical connections. Increases in electrical resistance caused by poor electrical connections described above result in increases in temperature during current flow which could also result in ignition of flammable material in close proximity.

SUMMARY OF THE INVENTION

An object of the present invention is to provide electrical receptacles and switches having electrical contact members for electrically connecting insulated electrical conductors without stripping, forming and connecting wires of the electrical conductors by screws.

The present invention is directed to an electrical component for electrical connection to insulated electrical conductors comprising a dielectric housing including a first housing section and a second housing section, first and second electrical contact members disposed in the dielectric housing and having first contacts and second contacts positioned in the first housing section; insulation-displacement contacts as part of the first contacts along which the insulated electrical conductors are positioned, and conductor-moving members for engaging the insulated electrical conductors for moving the insulated electrical conductors into the insulation-displacement contacts thereby effecting electrical connections between the insulation-displacement contacts and the insulated electrical conductors.

BRIEF DESCRIPTION OF THE DRAWINGS

Embodiments of the present invention will now be described by way of example with reference to the accompanying drawings in which.

DETAILED DESCRIPTION OF THE INVENTION

Figure 1:
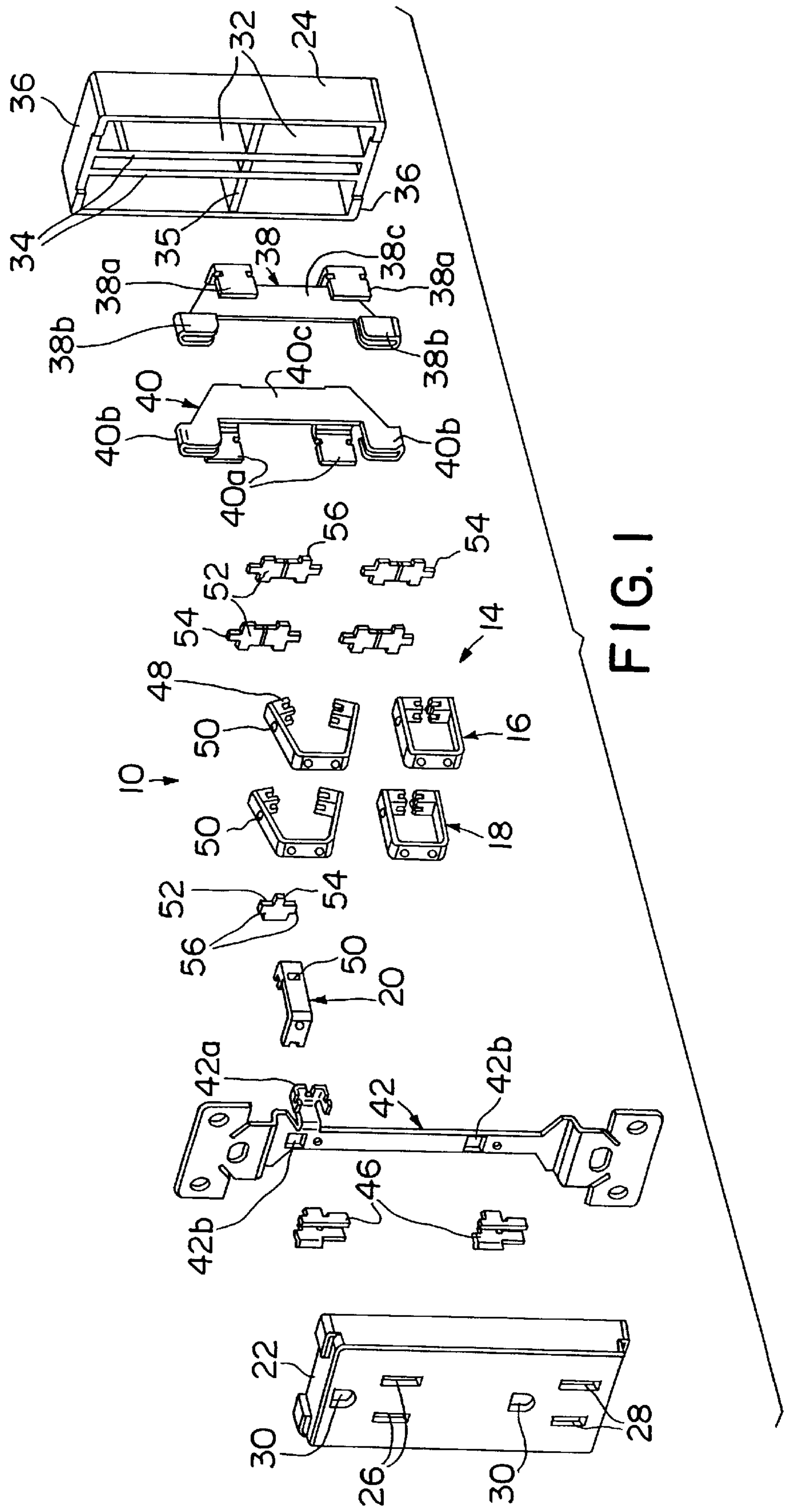
FIG. 1 is an exploded perspective view of the various parts of an electrical receptacle having pivotable conductor-connecting members for moving electrical conductors into insulation-displacement contacts.
Figure 2:
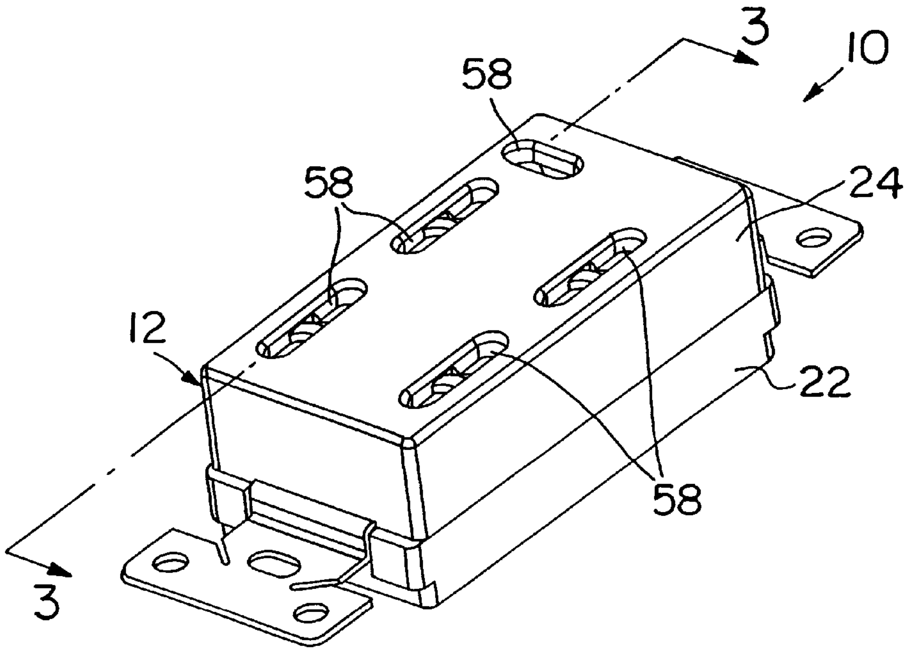
FIG. 2 is a perspective view of an assembled electrical receptacle of FIG. 1.
Figure 3:
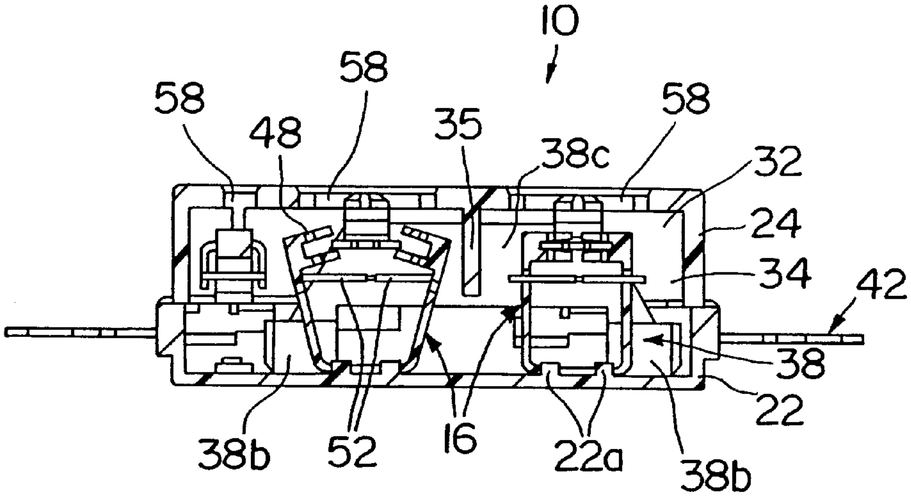
FIG. 3 is a cross-sectional view taken along line 3—3 of FIG. 2.

As shown in FIGS. 1–3, electrical receptacle 10 includes a dielectric housing 12, electrical contact assembly 14, and pivotable conductor-moving members 16, 18, 20.

Dielectric housing 12 includes a first housing section 22 and a second housing section 24. First housing section 22 has upper and lower pairs of slots 26, 28 extending therethrough with one slot being longer than the other. A D-shaped hole 30 is disposed above each pair of slots 26, 28 centrally thereof.

Second housing section 24 has compartments 32 and inner parallel walls 34 extending between end walls 36.

Electrical contact assembly 14 includes a first contact member 38, a second contact member 40, and a ground contact member 42. First contact member 38 includes insulation-displacement contacts 38*a*, receptacle contacts 38*b*, and a bridge section 38*c*. Second contact member 40 likewise includes insulation-displacement contacts 40*a*, receptacle contacts 40*b*, and a bridge section 40*c*. Ground contact member 42 constitutes a metal-mounting bracket from which insulation-displacement contact 42*a* extends and square holes 42*b*. spring contacts 46 are secured on the metal-mounting bracket with spring contact members extending within the square holes 42*b*.

As can be seen, insulation-displacement contacts 38*a*, 40*a* extend outwardly from the bridge sections 38*c*, 40*c* as S-shaped members with opposing slots in the inner and outer legs of the S-shaped members that extend parallel to the bridge sections 38*c*, 40*c*. Insulation-displacement contact 42*a* extends outwardly from the metal-mounting bracket adjacent the upper square hole 42*b* as an L-shaped member with a slot disposed in the outer leg; extensions having aligned slots therein extend toward the metal-mounting bracket from each side of the outer leg.

Pivotable conductor-moving members 16, 18 are U-shaped, the bights thereof are heat-staked to an inside surface of the first housing section 22 via spaced integral projections 22*a* that extend through respective holes in the bights as shown in FIG. 3. The opposing legs of the U-shaped conductor-moving members 16, 18 are spring members having spaced fork members 48 at their outer ends, and the opposing legs are normally disposed parallel to each other.

Pivotal conductor-moving member 20 is L-shaped; its inner short leg is heat-staked to the inside of surface of the first housing section 22 while its outer long leg has spaced fork members at the outer end thereof. Apertures 50 are located in the opposing legs and the outer long leg of the conductor-moving members 16, 18, 20 adjacent the spaced fork members 48.

Assembly of the electrical receptacle 10 is as follows: conductor-moving members 16, 18 and 20 are heat-staked to the inside surface of the first housing section 22. The bridge section 38*c* of the first contact member 38 is disposed in a slot (not shown) of a section of a central wall 35 along one of the inner parallel walls 34 so that the insulation-displacement contacts 38*a* and receptacle contacts 38*b* are disposed in respective compartments 32. The bridge section 40*c* of the second contact member 40 is likewise disposed in a slot of a section of the central wall 35 along the other of the inner parallel walls 34 so that the insulation-displacement contacts 40*a* and receptacle contacts 40*b* are disposed in respective compartments 32. Actuating members 52 have projections 54 which are disposed adjacent apertures 50 of the opposing legs of the U-shaped conductor-moving members 16, 18 so as to move them outwardly in a biased position as shown in the left side of FIG. 3. The projection 54 of the actuating members 52 is positioned above aperture 50 of the pivotable conductor-moving members 20, and wings 56 of the actuating members 52 are respectively disposed in the aligned slots of the outer legs of the insulating-displacement contacts 38*a*, 40*a* and of the extensions of the insulating-displacement contact 42*a* so that the conductor-moving members 16, 18, 20 are biased outwardly from the insulation-displacement contacts 38*a*, 40*a*, 42*a*. Metal-mounting bracket 42 is placed along the first housing section 22 so that it extends therealong. The first housing section 22 with the metal-mounting bracket 42 and the conductor-moving members 16, 18, 20 thereon is positioned onto the second housing section 24 so that the metal-mounting bracket 42 extends along the space between the inner parallel walls 34, the insulation-displacement contact 42*a* and biased conductor-moving member 20 are disposed in the space between the walls 34, and the conductor-moving members 16, 18 are positioned in respective compartments 32 in operative alignment with respective insulation-displacement contacts 38*a*, 40*a* as shown in FIG. 3. The first and second housing sections 22, 24 are secured together as by rivets thereby completing the assembly of electrical receptacle 10 as shown in FIGS. 2, 3.

Slots 26, 28 are in alignment with respective receptacle contacts 38*b*, 40*b* of first and second contact members 38, 40 and D-shaped holes 30 are in alignment with the spring contact members of spring contacts 46. Insulation-displacement contacts 38*a*, 40*a*, 42*a* and associated conductor-moving members 16, 18, 20 are in alignment with respective oblong openings 58 extending through a bottom wall of the second housing section 24.

To electrically connect as insulated electrical conductor of a power line to first contact member 38, an end of the electrical conductor is inserted through one of the oblong openings 58 associated therewith and between the spaced fork members 48 until it engages the actuating member 52 which moves downwardly causing the projection 54 to move into the aperture 50 so that the leg of the conductor-moving member springably moves inwardly thereby driving the electrical conductor within the slot of the insulating-displacement contact 38*a* and causing the slot to cut through the insulation of the electrical conductor and electrically connecting with the conductive core thereof. The same operation is repeated for the other insulated electrical conductor of the power line as it is inserted through the oblong opening 58 associated with the second contact member 40 and the insulated ground conductor of the power line as it is inserted through the oblong opening 58 associated with the ground contact member 42.

Figure 4:
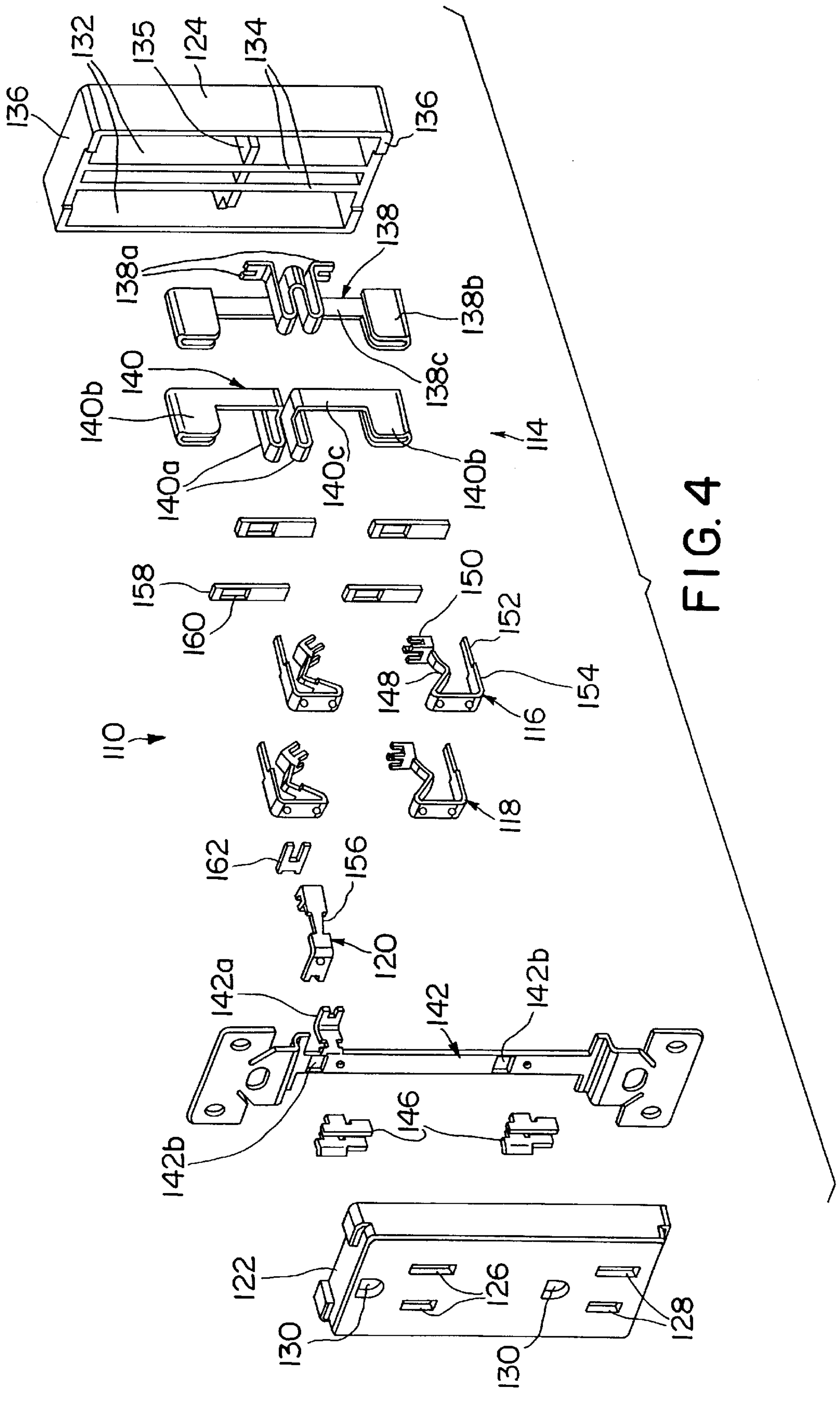
FIG. 4 is an exploded perspective view of the various parts of another embodiment of the electrical receptacle.
Figure 5:
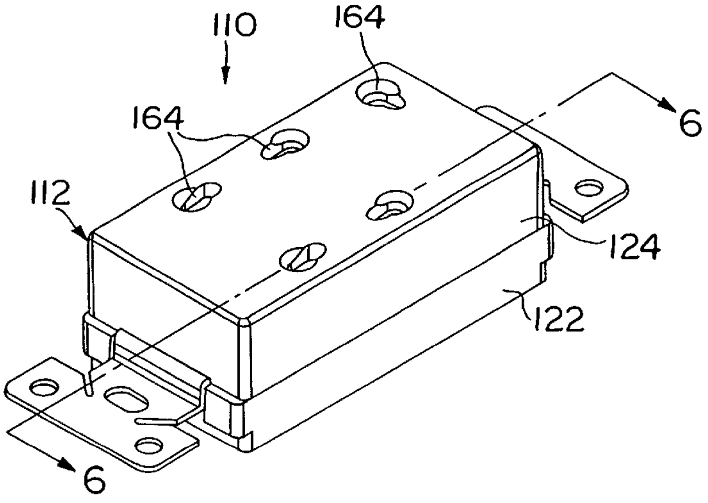
FIG. 5 is a perspective view of the assembled electrical receptacle of FIG. 4.
Figure 6:
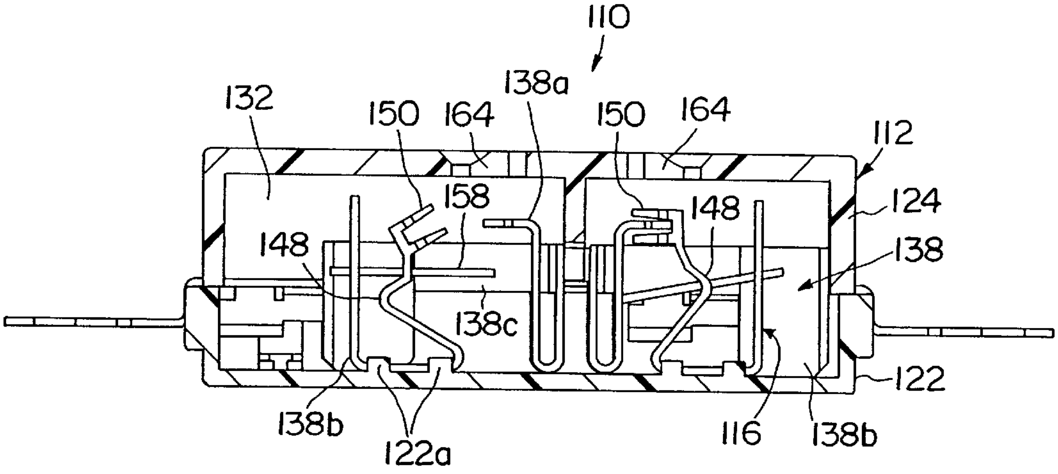
FIG. 6 is a cross-sectional view taken along line 6—6 of FIG. 6.

FIGS. 4–6 show electrical receptacle 110, another embodiment of the present invention. Electrical receptacle 110 includes a dielectric housing 112, electrical contact assembly 114, and pivotable conductor-moving members 116, 118, 120.

Dielectric housing 112 includes a first housing section 122 and a second housing section 124. First housing section 122 has upper and lower pairs of slots 126, 128 extending therethrough with one of the slots being longer than the other. A D-shaped hole 130 is disposed above each pair of slots 126, 128 centrally thereof.

Second housing section 124 has compartments 132 and inner parallel walls 134 extending between end walls 136.

Electrical contact assembly 114 includes a first contact member 138, a second contact member 140, and a ground contact member 142. First contact member 138 includes insulation-displacement contacts 138*a*, receptacle contacts 138*b*, and a bridge section 138*c*. Second contact member 140 likewise includes insulation-displacement contacts 140*a*, receptacle contacts 140*b*, and a bridge section 140*c*. Ground contact member 142 constitutes a metal-mounting bracket from which insulation-displacement contact 142*a* extends and square holes 142*b*. Spring contacts 146 are secured on the metal-mounting bracket with spring contact members extending within the square holes 142*b*.

As can be seen from FIG. 4, insulation-displacement contacts 138*a*, 140*a* extend from a U-shaped section of the bridge sections 138*c*, 140*c* and they extend from the U-shaped section as U-shaped members with the ends of the outer legs of the U-shaped members being normal thereto and containing slots therein. Insulation-displacement contact 142*a* extends outwardly from the metal-mounting member adjacent the upper square hole 142*b* as an L-shaped member with a slot in the outer leg. Aligned slots are located in the inner leg of the L-shaped member.

Pivotable conductor-moving members 116, 118 are substantially U-shaped, the bights thereof are heat-staked to an inside surface of the first housing section 122 via spaced integral projections 122*a* that extend through holes in the bights as shown in FIG. 6. One leg of the U-shaped conductor-moving members 116, 118 is a spring member having a bend 148 therein and spaced fork members 150 at the outer ends thereof, whereas the other leg about midway thereof has a narrow outer section 152 thereby forming shoulders at a junction between an inner section 154 and outer section 152.

Pivotable conductor-moving member 120 is L-shaped; its inner short leg is heat-staked to the inside surface of the first housing section 122 while its outer long leg has spaced fork members at the outer end thereof. The outer long leg has a necked-down section 156 that is stepped.

Assembly of the electrical receptacle 110 is as follows: conductor-moving members 116, 118, 120 are heat-staked to the inside surface of the first housing section 122. Bridge sections 138*c*, 140*c* of the first and second contact members 138, 140 are disposed in respective compartments 132 of the second housing section 124 while the bights of the U-shaped sections of the bridge sections are disposed in recesses of a central wall 135 so that the insulation-displacement contacts 138*a* of first contact member 138 and those of the second contact member 140 are disposed within respective compartments 132 along with parts of the receptacle contacts 138*b* and 140*b*. Actuating members 158 are metal plates that have elongated apertures 160 located in about one-half the length thereof. Actuating members 158 are assembled onto conductor-moving members 116, 118 as shown in the left side of FIG. 6 so that the outer ends of the elongated apertures 160 engage the shoulders on the other of the legs and the inner ends of the elongated apertures 160 are disposed on the one of the legs above the bends 148 and just below the spaced fork members 150. Thus, actuating members 158 move the one leg containing the spaced fork members 150 toward the other leg so that the one leg is in a spring-biased position. Actuating member 162 is U-shaped and the legs thereof are disposed in the aligned slots of the inner leg of the insulation-displacement contact 142*a* after the metal-mounting member 142 has been positioned against the first housing section 122 whereafter the legs of the actuating members 162 are positioned at the upper end of the necked-down section 156 of the conductor-moving member 120 so that it is in a spring-biased position. The first housing section 122 with the metal-mounting bracket 142 and the conductor-moving members 116, 118, 120 thereon is positioned onto the second housing section 124 so that the metal-mounting bracket 142 extends along the space between the inner parallel walls 134, the insulation-displacement contact 142*a* and the biased conductor-moving member 120 are disposed in the space between the walls 34, and the biased conductor-moving members 116, 118 are positioned in respective compartments 132 in operative alignment with respective insulation-displacement contacts 138*a*, 140*a* as shown in FIG. 6. The first and second housing sections 122, 124 are secured together as by rivets thereby completing the assembly of the electrical receptacle 110 as shown in FIGS. 5, 6.

Slots 126, 128 are in alignment with respective receptacle contacts 138*b*, 140*b* of first and second contact members 138, 140, and D-shaped holes 130 are in alignment with the spring contact members of spring contacts 146. Insulation-displacement contacts 138*a*, 140*a*, 142*a* and associated conductor-moving members 116, 118, 120 are in alignment with respective keyhole-shaped openings 164 extending through a bottom wall of the second housing section 124.

To electrically connect an insulated electrical conductor of a power line to first contact member 138, an end of the electrical conductor is inserted through one of the keyhole-shaped openings 164 associated therewith into engagement with the actuating member 158 which moves downwardly so that the slot 160 moves into the bend 148 causing the one leg of the conductor-moving member to springably move inwardly thereby driving the electrical conductor within the slot of the insulation-displacement contact 138*a* and causing the slot to cut through the insulation of the electrical conductor and electrically connecting with the conductive core thereof. The same operation is repeated for the other insulated electrical conductor of the power line as it is inserted through the keyhole-shaped opening 164 associated with the second contact member 140. As regards the insulated ground conductor of the power line, it is inserted through the keyhole-shaped opening 164 associated with the ground contact member 142 into engagement with the actuating member 162 which moves downwardly along the necked-down section 156 causing the conductor-moving member to springably move inwardly thereby driving the ground conductor within the slot of the insulation-displacement contact 142*a* and causing the slot to cut through the insulation of the ground conductor and electrically connecting with the conductive-core thereof.

Figure 7:
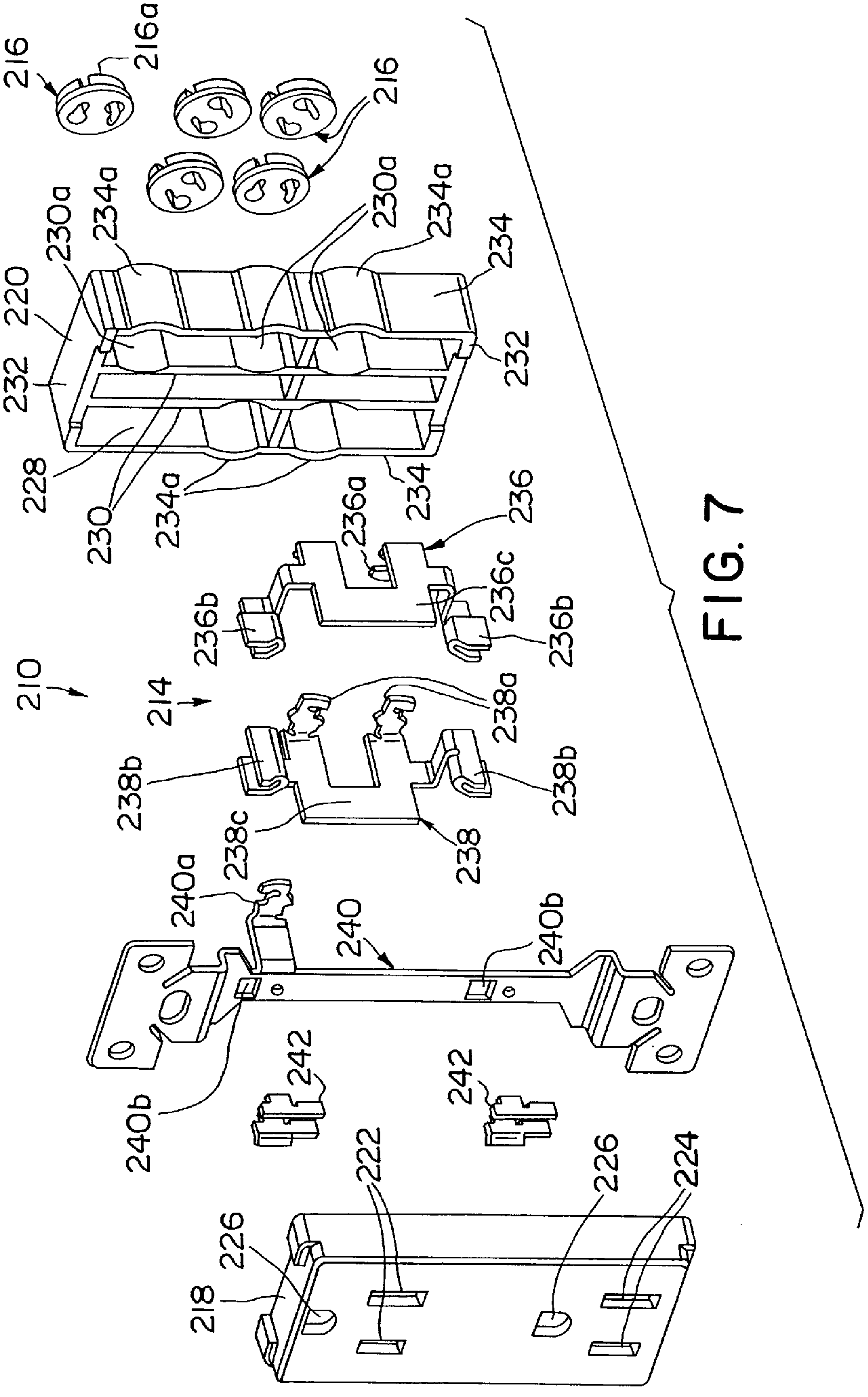
FIG. 7 is an exploded perspective view of the various parts of a further embodiment of the electrical receptacle.
Figure 8:
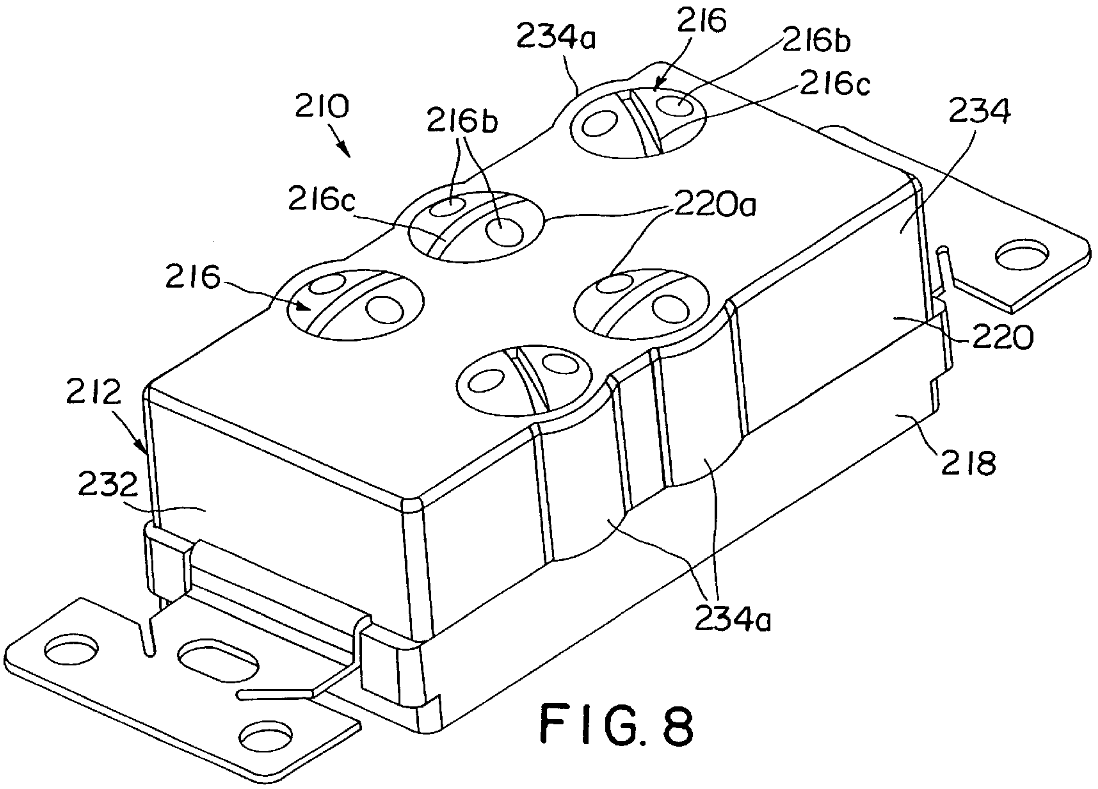
FIG. 8 is a perspective view of the assembled electrical receptacle of FIG. 7.
Figure 9:
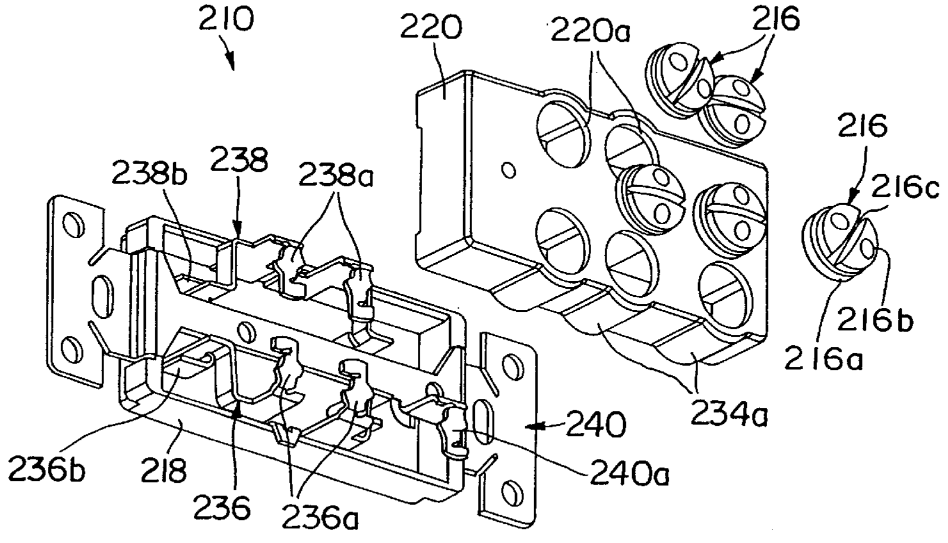
FIG. 9 is an exploded perspective view of FIG. 7.

FIGS. 7–9 show electrical receptacle 210, a further embodiment of the present invention. Electrical receptacle 210 includes a dielectric housing 212, electrical contact assembly 214, and conductor-moving members 216.

Dielectric housing 212 includes a first housing section 218 and a second housing section 220. First housing section 218 has upper and lower pairs of slots 222, 224 extending therethrough with one slot being longer than the other. A D-shaped hole 226 is disposed above each pair of slots 222, 224 centrally thereof.

Second housing section 220 has compartments 228 and inner parallel walls 230 extending between end walls 232. Outer walls 234 have arcuate areas 234*a* opposite arcuate areas 230*a* provided by inner parallel walls 230.

Circular openings 220*a* extend through a bottom wall of the second housing section 220 where opposed arcuate areas 230*a*, 234*a* are located.

Electrical contact assembly 214 includes a first contact member 236, a second contact member 238, and a ground contact member 240. First contact member 236 includes insulation-displacement contacts 236*a*, receptacle contacts 236*b*, and a U-shaped bridge section 236*c*. Second contact member 238 includes insulation-displacement contacts 238*a*, receptacle contacts 238*b*, and a U-shaped bridge section 238*c*. Ground contact member 240 constitutes a metal-mounting bracket from which insulation-displacement contact 240*a* extends and square holes 240*b*. Spring contacts 242 are secured on the metal-mounting bracket with spring contact members extending into the square holes 240*b*.

As can be seen, insulation-displacement contacts 236*a*, 238*a* extend normal to the ends of the legs of the U-shaped bridge sections 236*c*, 238*c* and they have inner and outer slots therein that extend in opposite directions. Receptacle contacts 236*b*, 238*b* extend outwardly from outer edges of the legs of the U-shaped bridge sections 236*c*, 238*c* via L-shaped members with the receptacle contacts 236*b*, 238*b* being located at the ends of the long legs of the L-shaped members. Thus, the insulation-displacement contacts 236*a*, 238*a* and the receptacle contacts 236*b*, 238*b* extend in the same direction. Insulation-displacement contact 240*a* is a short leg of an L-shaped member that extends from the metal-mounting member and it has the same structure as that of insulation-displacement contacts 236*a*, 238*a*, i.e., inner and outer slots that extend in opposite directions.

Conductor-moving members 216 are made of dielectric material, they are annular with a bottom annular projection 216*a*, the bottom surface is flat, whereas the upper surface is part spherical, holes 216*b* extend therethrough on opposite sides of a slot 216*c* extending thereacross. Conductor-moving members 216 are disposed in the respective opposed arcuate areas 230*a*, 234*a* with the annular projections 216*a* engaging an inner surface of the second housing section 220 so that the part spherical upper surface and slot are exposed in holes 220*a* as shown in FIG. 8.

Assembly of the electrical receptacle 210 is as follows: conductor-moving members 216 are positioned in respective opposed arcuate areas 230*a*, 234*a* and holes 220*a*, first and second contact members 236, 238 are positioned in the second housing section 220 with the insulation-displacement contacts 236*a*, 238*a* being disposed in respective opposed arcuate areas 230*a*, 234*a* adjacent respective conductor-moving members 216. Metal-mounting member 240 is positioned along the space between walls 230 with insulation-displacement contact 240*a* being disposed in the upper right-hand opposed arcuate areas 230*a*, 234*a* (FIGS. 7, 9) adjacent the conductor-moving member 216 therein. The first housing section 218 is mounted on the second housing section 220 and they are secured together preferably by rivets thereby completing the assembly of electrical receptacle 210 as shown in FIG. 8, whereby receptacle contacts 236*b*, 238*b* and the spring contact members of the spring contacts 242 are in alignment with the respective slots 222, 224 and D-shaped holes 226.

To electrically connect an insulated electrical conductor of a power line to first contact member 236, an end of the electrical conductor is inserted through a hole 216*b* of conductor-moving member 216 and into compartment 228 past the insulation-displacement contact 236*a* with slot 216*c* being positioned normal to outer wall 234. A blade of a screw driver is inserted into slot 216*c* and turns conductor-moving member 216 clockwise thereby forcing the electrical conductor into one of the slots of the insulation-displacement contact 236*a* whereby the slot cuts through the insulation of the electrical conductor and electrically connects with the conductive core thereof. The same operation is repeated for the other insulated electrical conductor and the insulated ground conductor of the power line as they are inserted through holes 216*b* of the respective conductor-moving members 216 thereby electrically connecting them to the insulation-displacement contacts 238*a* and 240*a* of the second contact member 238 and the ground contact member 240.

From the foregoing, electrical receptacles have been disclosed that can readily electrically connect insulated electrical conductors of a power line to insulation-displacement contacts of electrical contacts within a dielectric housing without having to strip insulation from the insulated electrical conductors.

What is claimed is:

1. An electrical receptacle for electrical connection to insulated electrical conductors comprising:

a dielectric housing including a first housing section and a second housing section;

first and second electrical contact members disposed in the dielectric housing and having first contacts in alignment with slots of the dielectric housing and second contacts in alignment with openings of the dielectric housing, the second contacts including insulation-displacement contacts;

conductor-moving members associated with the insulation-displacement contacts for moving the insulated electrical conductors into the insulation-displacement contacts, the conductor-moving members including spring members; and actuating members arranged in the dielectric housing to position the conductor-moving members at a spring-biased position relative to the insulation displacement contacts, wherein the actuating members are engaged and moved upon insertion of the insulated electrical conductors into the openings of the dielectric housing, thereby releasing the conductor-moving members which engage the insulated electrical conductors and drive them into engagement with the insulation-displacement contacts, thereby effecting electrical connections between the insulation-displacement contacts and the insulated electrical conductors.

2. An electrical receptacle as claimed in claim 1, wherein the conductor-moving members have spaced fork members at outer ends thereof.

3. An electrical receptacle as claimed in claim 2, wherein the actuating members have wings disposed in aligned slots of the insulation-displacement contacts and projections disposed adjacent the spaced fork members of the conductor-moving members.

4. An electrical receptacle as claimed in claim 2, wherein the actuating members are plates having elongated slots, the conductor-moving members have bends therein, outer ends of the elongated slots engage shoulders of legs of the conductor-moving members, and inner ends of the elongated slots are disposed above the bends.

5. An electrical receptacle for electrical connection to insulated electrical conductors comprising:

a dielectric housing including a first housing section and a second housing section;

first and second electrical contact members disposed in the dielectric housing and having first contacts in alignment with slots of the dielectric housing and second contacts in alignment with openings of the dielectric housing, the second contacts including insulation-displacement contacts; and conductor-moving members associated with the insulation-displacement contacts for moving the insulated electrical conductors into the insulation-displacement contacts, wherein the conductor-moving members comprise annular members disposed in holes in the second housing section in alignment with the insulation-displacement contacts, and conductor-receiving holes extend through the annular members for receiving the insulated electrical conductors.

* * * * *